Figure 1:
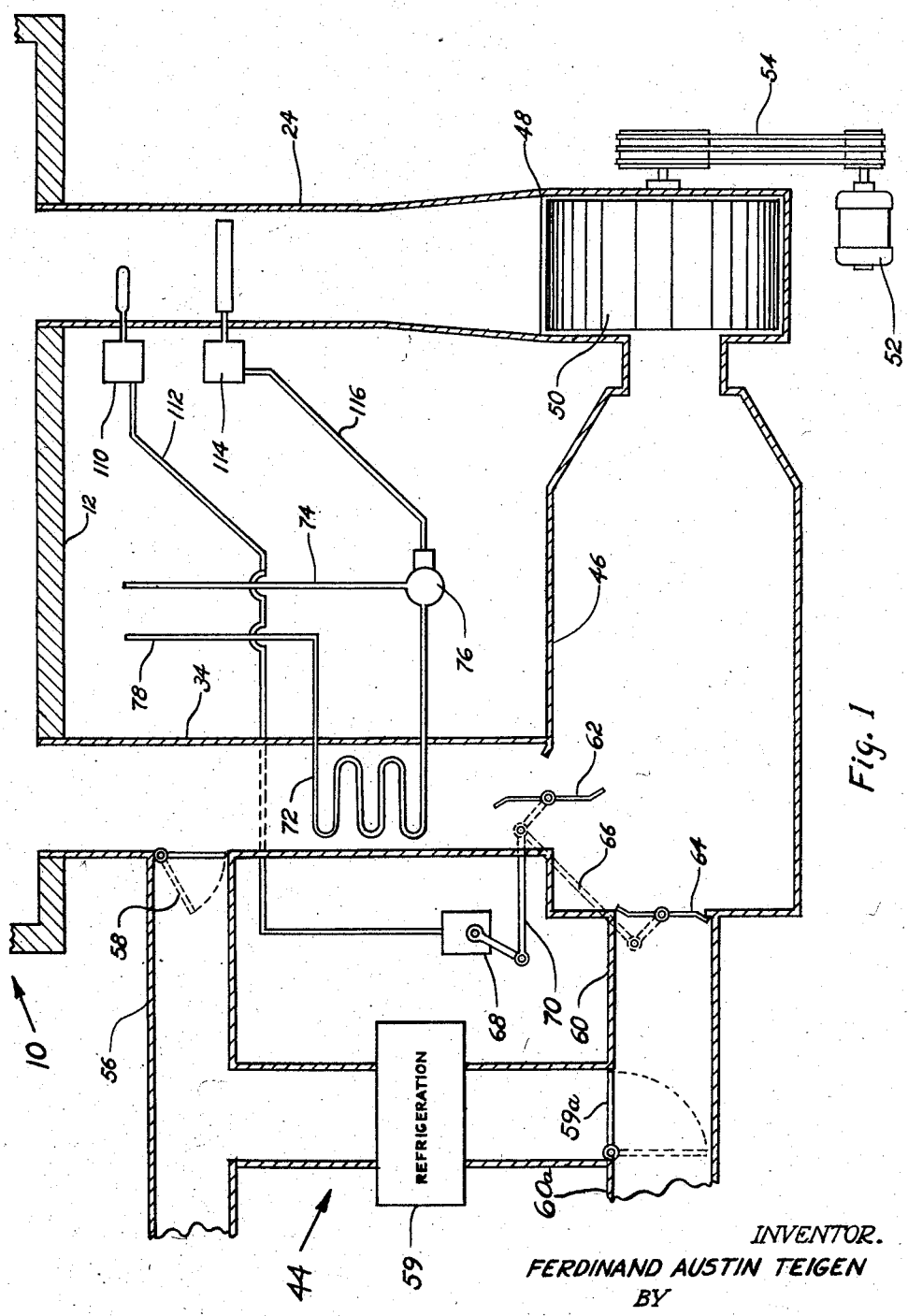

Oct. 14, 1958 F. A. TEIGEN 2,855,839
METHOD OF TREATING PERISHABLE ONIONS IN STORAGE
Filed March 9, 1953 2 Sheets-Sheet 1

INVENTOR.
FERDINAND AUSTIN TEIGEN
BY
Whiteley & Caine
Attorneys

Oct. 14, 1958 F. A. TEIGEN 2,855,839
METHOD OF TREATING PERISHABLE ONIONS IN STORAGE
Filed March 9, 1953 2 Sheets-Sheet 2
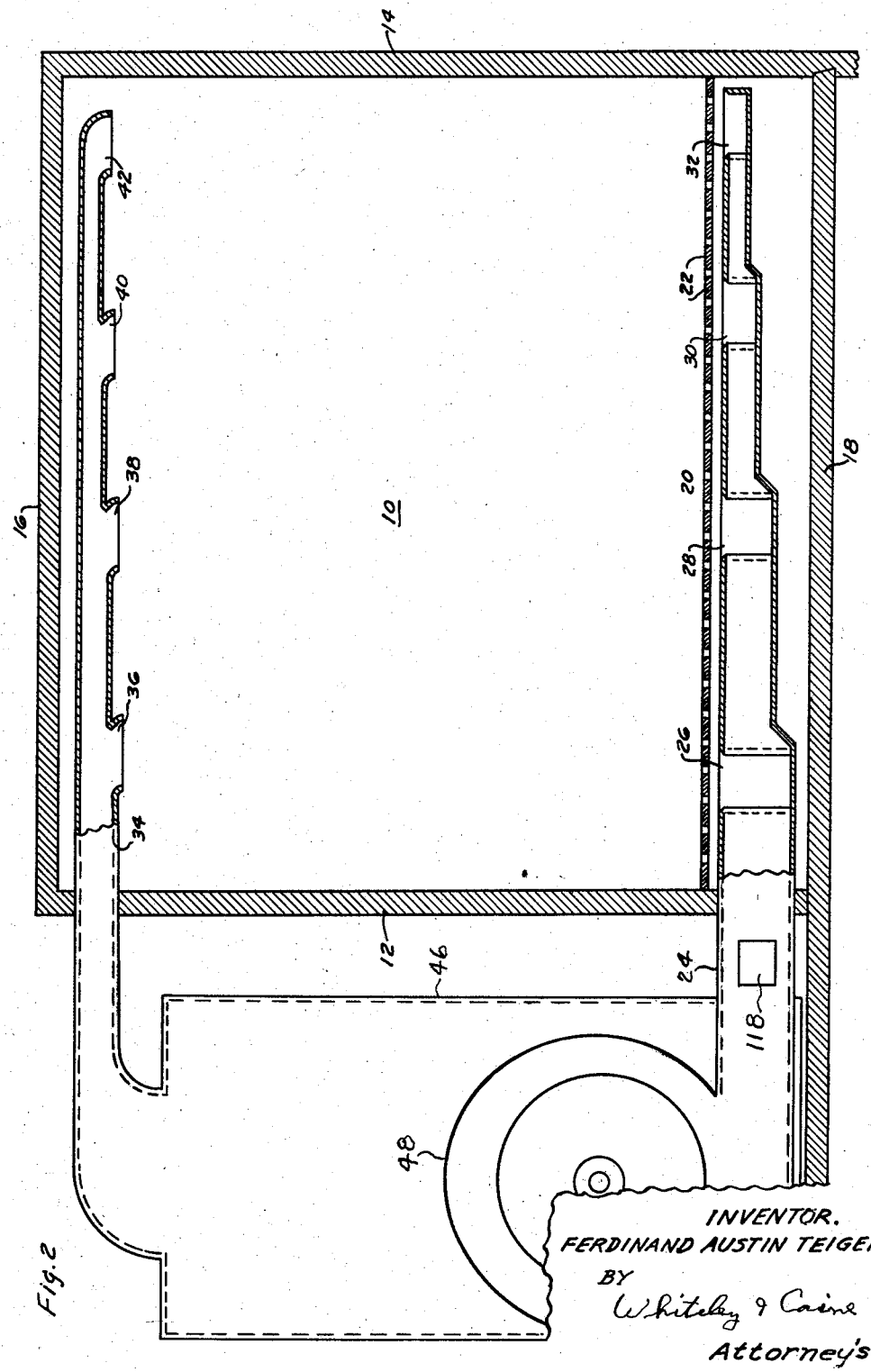

United States Patent Office 2,855,839
Patented Oct. 14, 1958

2,855,839

METHOD OF TREATING PERISHABLE ONIONS IN STORAGE

Ferdinand Austin Teigen, Minneapolis, Minn., assignor to D. M. Russell, Minneapolis, Minn.

Application March 9, 1953, Serial No. 341,038

14 Claims. (Cl. 98—33)

This invention relates to a method of preserving perishable onions in storage. In general the invention is concerned with the preservation of onions, and other similar perishables in storage by the compounding and utilization of a composite air of predetermined characteristics which is introduced into the storage space and in intimate contact with the product to retard deterioration thereof.

This application is a continuation in part of my prior application Serial No. 2,153 filed January 14, 1948, now abandoned.

In order to properly preserve perishables, such as fresh onions, it is desirable to circulate air into contact with the product, and it is highly important to properly regulate both the temperature and the moisture content of the air. The temperature should be low enough to inhibit bacterial growth and yet not so low as to cause freezing, and the moisture content should be high enough to prevent dehydration and yet not so high as to encourage the growth of low temperature bacteria and/or molds. As an example I have discovered that if dry onions are stored in an area where the moisture content of the air is too low the skin or hulls crack and loosen, which results in reduction in commercial value. Conversely, if the moisture content of the air is too high, mold and bacterial action sets in resulting in deterioration through disease. The temperature of the air is equally important and in fact is critical at the time when it contacts the product. If the temperature is even a fraction of a degree too low, great damages may result from physiological shock and disturbance of the metabolism of the product. In the case of onions and similar produce the optimum storage temperature is 32° F., and therefore the air at the time of contact must be sufficiently cool to preserve the product without freezing.

In the present invention it is proposed to provide a method of preserving perishable onions by withdrawing air from the storage space in which the onions are situated and forming or compounding a return or supply column of air which includes some of the withdrawn air and a diluent having a lower moisture content and/or lower temperature, and forming a composite which is of the desirable temperature and moisture content for treatment of the perishable product to retard deterioration, and returning the composite thus formed into intimate contact with the onions in storage.

As perishables of the type mentioned are frequently grown and stored in areas having relatively cold winter climate, it will be appreciated that outdoor air may be used for refrigerating purposes, and also as a source of relatively dry air since the winter climate in the growing areas is generally below 32° F. and will therefore reduce the moisture content of the air. However, in the event that outdoor air is not sufficiently dry and cool to be used in this invention in its existing condition, any other source of dry, cool air may be used, including all or a portion of the withdrawn air which has been suitably processed or conditioned to give the proper low temperature and low moisture content. In either event, dry cool air is used as a diluent of the return air. The condition of the dilution is measured, both as to temperature and humidity immediately before entry into the storage space, and these measurements separately and collectively are utilized to control the compositing and treatment of the dilution to bring it within the desired limits.

An object of the invention is to provide a method of treating perishable onions to inhibit deterioration by circulating air having optimum temperature and moisture characteristics into contact with the onions.

Another object is to preserve stored perishable onions by circulating the storage air and diluting the same with cooler and/or drier air when the temperature and/or the humidity of the circulated air returning to the storage space is above a predetermined limit.

Another object is to utilize cool dry air to provide only a drying effect or only a cooling effect, or both in predetermined measure.

Another object is to control the moisture content of supply air by imparting heat to return air in conjunction with maintaining a predetermined dry bulb temperature by diluting the return air with drier, cooler air from any convenient source.

Other and further objects of the invention will be apparent to those skilled in the art upon a consideration of the following description and claims, and in the appended drawings disclosing an exemplary embodiment of the invention, in which:

Fig. 1 discloses a schematic representation of apparatus for treating air which is utilized for treatment of perishable onions and the like, with a portion of the storage space broken away; and, Fig. 2 is a side elevation of a portion of the structure shown in Fig. 1 and a storage space in which the perishables are stored and treated in accordance with the present invention.

Referring to the appended drawings, which are schematic and intended for illustrative purposes only, general reference numeral 10 indicates an enclosure, which as shown in Fig. 2 consists of walls 12, 14, 16, and 18 that define a space within which perishables such as onions may be stored. Enclosure 10 in itself forms no part of the present invention and would be suitably designed for the storage of onions. Within the interior of enclosure 10 and extending over the entire lower surface thereof, is a false floor 20 composed of a multiplicity of spaced slats 22 which are sufficiently close in their spacing to prevent small articles, such as onions and the like, from penetrating the false floor 20, but the spaces are sufficiently large to permit the free circulation of air between the slats 22. Between the floors 18 and 20 is an inlet air duct 24 that extends through one dimension of enclosure 10, and has a plurality of laterally extending branches 26, 28, 30 and 32. While not shown, each of the branches are provided with small openings for discharging air under the false floor 20 where it may penetrate between the slats and pass in intimate contact with the onions within enclosure 10. The inlet duct 24 penetrates wall 12 and is connected to apparatus situated outside of the enclosure 10, which will be described hereinafter.

Also situated within enclosure 10 beneath the upper wall 16 is a return duct 34 which contains a plurality of openings 36, 38, 40 and 42 for receiving air from the enclosure and conducting the same outwardly therefrom. As is clearly shown, duct 34 also penetrates wall 12 and is also connected to apparatus outside of enclosure 10.

Referring now to Fig. 1, general reference numeral 44 indicates apparatus for treating air which is used in this invention for treating perishable onions within enclosure 10 to inhibit deterioration. A casing 46 is suitably connected to a fan casing 48 that contains a blower 50 driven by a motor 52 through suitable connections such as belts 54. The blower is provided to draw air from casing 46, and passages connected thereto, and discharge the same into inlet duct 24 in sufficient volume to contact all of the perishable onions within enclosure 10. The return duct 34 extending from enclosure 10 is suitably connected to casing 46 at a part thereof spaced substantially from the inlet opening in fan casing 48. Extending from duct 34 is a discharge duct 56, and at the junction of these ducts is a gravity or pressure controlled damper 58 which permits discharge of air from duct 34. Duct 56 ordinarily discharges to outside atmosphere, but, as will be pointed out hereinafter, when desired it may be connected to suitable refrigeration apparatus designated at 59, which is provided with a damper 59a.

Also connected to casing 46 is a duct 60 and an extension 60a which extends from a suitable source of drier, cooler air. In many instances the perishables with which this invention is concerned are grown in Northern regions where after harvest the outside atmosphere is naturally cooled sufficient to permit its use as a refrigeration medium. Under such conditions the outside air will for long periods of time during the winter months be at a natural temperature of less than 32° F. and consequently its moisture content will be relatively low. If, however, the process of this invention is to be practiced in areas where outside air is not substantially below 32° F. and its moisture content is not correspondingly low, then by adjustment of damper 59a some or all of the air will be drawn through the apparatus 59 as the source of drier, cooler air.

At the inner terminal ends of ducts 34 and 60 are dampers 62 and 64 that are interconnected by a linkage shown in dotted lines at 66. A motor 68 of modulating or spring return type is connected to a linkage 70 that is joined to linkage 66. Dampers 62, 64 are provided to control flow of air withdrawn from enclosure 10 and also the supply of dry cool air, which hereinafter will be referred to as a diluent of the withdrawn air, regardless of the amount of air contributed respectively by ducts 34 and 60 to form a composite air that is the source of supply air returned through duct 24 to the enclosure 10.

A source of heat, here shown in the form of a serpentine coil 72 is provided to impart heat to the supply air. Coil 72 is shown within the outlet or return air duct 34, but this is a mere matter of convenience and if desired it may by suitable adaptation be situated within the casing 46, since heat is imparted to volumetrically increase the diluent and not substantially raise the temperature of the dilution, which is returned to the enclosure. An inlet conduit 74 is joined to one end of coil 72 and contains a suitable control device, here shown as a motorized modulating valve 76. An outlet conduit 78 extends from the other end of coil 72. Conduit 74, while not shown, extends from a suitable source of steam or hot water. If either of these sources of heat are not available, any other suitable source of heat may be used.

Situated in the supply duct 24 is a thermostat 110 which is responsive to the dry bulb temperature of supply air or dilution returning to enclosure 10. Thermostat 110 is connected by a cable 112 to motor 68. The cable 112 will contain three or more wires depending on the type of control devices used, but for the purpose of this invention it will be assumed that thermostat 110 is through a balancing electrical circuit capable of effecting modulating movement of motor 68 in either direction, in response to changes in temperature of supply air to apportion the proportions of withdrawn air and diluent entering casing 46.

Also situated in the supply duct 24 is a humidistat 114 which is responsive to the humidity of the enveloping supply air or dilution. Humidistat 114 is connected by a cable 116 to valve 76 and contains a plurality of wires depending on the type of control device used. Preferably, valve 76 may be modulated between its open and closed positions.

The process will now be explained in connection with its use for treating onions: During or just after harvesting, the onion bulbs are "topped" at their necks and they are preferably placed in the storage space in a bulk condition. For a period of six weeks two months the bulbs undergo a "curing" process in which they are maintained at a temperature of between 50° and 60° F., and an atmosphere whose relative humidity is substantially 70%. The curing process is a biological process in which wounds heal and the necks of the bulbs seal themselves, and the outer skin tightens around the bulb. The present apparatus is used during the curing process to treat the onions to be dry and of desired temperature by envelopment with air of required temperature and moisture content moving at relatively high velocity to dissipate heat and moisture evolved through respiration which if not dissipated, promptly creates deleterious conditions predisposing to rapid deterioration. At the conclusion of the primary curing process the apparatus is adjusted by reducing and maintaining the supply air temperature at about 32° F. with the relative humidity remaining at 70%. The air is forcibly circulated through the onions at a sufficient pressure so that it will move laterally as well as vertically through the mass and thus come into intimate contact with the surface of all of the onion bulbs. In the following examples the process will be explained in connection with the maintaining process rather than the initial curing although it should be understood that the steps are substantially identical.

With the parts disposed as shown in the drawing, and fan 50 in operation, air is circulated from room 10 through duct 34 to and through the fan and thence through duct 24, and its numerous branches to and through the product. For storage purposes thermostat 110 is adjusted to cause motor 68 to simultaneously open damper 64 and close damper 62 as the dry bulb temperature of supply air rises above 32° F. Humidistat 114 is set to open valve 76 and admit steam to the coil 72 when the relative humidity of air returning through duct 24, is greater than 70% or any other predetermined setting.

Assuming the supply air returning to enclosure 10 has a dry bulb temperature of 32° F. and a relative humidity of 70%, the only action which is taking place is the mere circulation of air. In the early stages of the storage treatment the air will be absorbing heat and moisture from the onions and under this condition thermostat 110 will respond to the rise in air temperature and energize motor 68 to cause damper 62 to move toward a closed position and damper 64 to move toward an open position. When this occurs, and assuming duct 60 to be in communication with dry cool air, the latter will be drawn into casing 46 to dilute the withdrawn air and reduce temperature thereof to the degree setting of thermostat 110. And because the supply air under the stated situation may contain more than 70% relative humidity, humidistat 114 will in such case respond to the higher moisture content of the air, causing valve 76 to move to an open position admitting steam to coil 72 to therby heat the withdrawn air. As was explained heretofore, it is not essential that heater 72 be situated in duct 34 since it could with equal usefulness be in casing 46. The purpose and result of adding heat to the withdrawn air or dilution is to increase the proportion of diluent, since any heat added to the dilution will be sensed by thermostat 110, which will cause motor 68 to be further actuated to increase the proportion of the dry, cool diluent. It has been emphasized heretofore that motor 68 and valve 76 are operated by modulating mechanisms and, therefore, as the proportion of diluent is increased the density of water vapor in the supply will be decreased to a point where the dampers 62 and 64 and valve 76 assume a co-relative position comprising a balanced condition, to supply a dilution of desired characteristics. Since air is being added to the total volume within the enclosure 10, a pressurized condition will form and damper 58 will move to a partly open position to permit discharge of a volume of air equal to that introduced through the duct 60.

After the storage process has proceeded for some time, the temperature of the withdrawn air will drop, and as a second condition it is assumed that thermostat 110 is satisfied, but humidistat 114 is still responding to a condition of excessive moisture in the supply air. Under these conditions valve 76 will gradually be opened to admit steam to heater 72, which in turn will affect thermostat 110 to the extent of admitting diluent through damper 64 from duct 60 to reduce the humidity or moisture content of air entering enclosure 10 and varying admission of diluent in ratio to variations in the admission of steam and the pressure thereof in heater 72 to a point of establishing balance between proportion of diluent and desired density of water vapor in dilution.

In the event that the outdoor or fresh air is above the desired limits of temperature and/or humidity, the damper 59a is adjusted to the dotted line position to draw air either from the outer end of duct 56 or from duct 34 past damper 58, or both, whence such air passes to and through the refrigerating apparatus 59, whereby its moisture and heat is reduced below the desired maximum, whereafter the dehumidified air passes into duct 60 and thence into casing 46 in the proportion determined by dampers 64 and 62. For the purpose of the present invention, it is considered that duct 60 is connected at all times with a source of air of required temperature and humidity, which is air having a dew point and dry bulb temperature substantially lower than the concurrent dew point and dry bulb temperature of the air within the enclosure.

The advantages of my invention reside in the provision of methods to treat and apportion component airs to compose a composite providing the necessary psychrometric conditions for the instant treatment of perishable onions to aid in their better cure and preservation.

I claim:

1. The method of preserving and/or curing onions which includes confining fresh perishable onions for treatment with conditioned air within a substantially airtight insulated enclosure; heating and admitting air from said enclosure into a mixing chamber; admitting from the outside into said mixing chamber fresh air having a dew point and dry bulb temperature substantially lower than the concurrent dew point and dry bulb temperature of the air within said enclosure; mixing said fresh air with said heated air; forcing the resultant mixed air from said mixing chamber into contact with and through said onions during the period that said onions are confined for treatment in said enclosure when the temperature of said onions is outside the degree of temperature fixed as the concurrently desired temperature of said onions and/or the relative humidity of the air within said enclosure is more than 70%, until the temperature of said onions is of said fixed degree and the relative humidity is less than 70%; discharging superfluous air from said enclosure to the outside; and regulating the dew point and dry bulb temperature of said mixed air when forced into initial contact with said onions by varying the heating of said heated air which is mixed with said fresh air in accordance with changes in the relative humidity of said mixed air prior to contact between said mixed air and said onions, and concurrently varying the volume of said fresh air which is mixed with said heated air in accordance with changes in the capacity of said heated air to heat the fresh air contained in the resultant mixed air to the degree of temperature fixed as the desired temperature of said mixed air when forced into initial contact with said onions.

2. The method of preserving and/or curing onions which includes confining fresh perishable onions for treatment with conditioned air within a substantially airtight insulated enclosure; heating and admitting air from said enclosure into a mixing chamber for mixture with fresh air to provide air having a dry bulb temperature substantially higher than the concurrent temperature of the air within said enclosure; admitting from the outside into said mixing chamber fresh air having a dew point and dry bulb temperature substantially lower than the concurrent dew point and dry bulb temperature of the air within said enclosure; mixing said fresh air with said heated air; forcing the resultant mixed air from said mixing chamber into contact with and through said onions during the period that said onions are confined for treatment in said enclosure when the temperature of said onions is outside the degree of temperature fixed as the concurrently desired temperature of said onions and/or the relative humidity of the air within said enclosure is more than 70%, until the temperature of said onions is of said fixed degree and the relative humidity of said air is less than 70%; discharging superfluous air from said enclosure to the outside; and varying the volume of said fresh air which is mixed with said heated air in accordance with changes in the capacity of said heated air to heat the fresh air with which it is mixed to the degree fixed as the desired temperature of said mixed air when forced into contact with said onions to thereby regulate said temperature of said mixed air.

3. The method of preserving and/or curing onions which includes confining fresh perishable onions for treatment with conditioned air within a substantially airtight insulated enclosure; admitting air from said enclosure into a mixing chamber; admitting from the outside into said mixing chamber fresh air having a dew point and dry bulb temperature substantially lower than that of said air admitted from said enclosure; mixing said fresh air with said air admitted from said enclosure; imparting heat to the resultant mixed air; forcing the resultant heated mixed air from the mixing chamber into contact with and through said onions during the period that said onions are confined for treatment in said enclosure when the temperature of said onions is outside the degree of temperature fixed as the concurrently desired temperature of said onions and/or the relative humidity of the air within said enclosure is more than 70%, until the temperature of said onions is of said fixed degree and the relative humidity of said air is less than 70%; discharging superfluous air from said enclosure to the outside; and regulating the dew point and dry bulb temperature of said mixed air when forced into initial contact with said onions by varying the amount of heat imparted to said mixed air in accordance with changes in the relative humidity of said mixed air subsequent to said impartation of heat thereto and prior to contact with said onions, and concurrently varying the volume of said fresh air which is mixed with said air admitted from said enclosure in accordance with changes in the capacity of the heat imparted to said mixed air to heat the fresh air contained in said mixed air to the degree of temperature fixed as the concurrently desired temperature of said mixed air when forced into initial contact with said onions.

4. The method of preserving and/or curing onions which includes confining fresh perishable onions for treatment with conditioned air within a substantially airtight insulated enclosure; admitting air from said enclosure into a mixing chamber; admitting from the outside into said mixing chamber fresh air having a few point and dry bulb temperature substantially lower than than of said air admitted from said enclosure; mixing said fresh air with said air admitted from said enclosure;

imparting heat to the resultant mixed air; forcing the resultant heated mixed air from said mixing chamber into contact with and through said onions during the period that said onions are confined for treatment in said enclosure when the temperature of said onions is outside the degree of temperature fixed as the concurrently desired temperature of said onions and/or the relative humidity of the air within said enclosure is more than 70%, until the temperature of said onions is of said fixed degree and the relative humidity of said air is less than 70%; discharging superfluous air from said enclosure to the outside; and varying the volume of said fresh air which is mixed with said air admitted from said enclosure in accordance with changes in capacity of the heat imparted to said mixed air to heat the fresh air contained in said mixed air to the degree of temperature fixed as the concurrently desired temperature of said mixed air when forced into initial contact with said onions and thereby regulating said temperature of said mixed air.

5. The method of preserving and/or curing onions which includes confining fresh perishable onions for treatment with conditioned air within a substantially airtight insulated enclosure; heating and admitted air from said enclosure into a mixing chamber; admitting air into said mixing chamber which air prior to admission into said mixing chamber is conditioned to have and has a dew point and dry bulb temperature substantially lower than the concurrent dew point and dry bulb temperature of the air within said enclosure; mixing said conditioned air with said heated air; forcing the resultant mixed air from said chamber into contact with and through said onions during the period that said onions are confined for treatment in said enclosure when the temperature of said onions is outside the degree of temperature fixed as the concurrently desired temperature of said onions and/or the relative humidity of the air within said enclosure is more than 70%, until the temperature of said onions is of said fixed degree and the relative humidity of said air is less than 70%; discharging superfluous air from said enclosure to the outside; and regulating the dew point and dry bulb temperature of said mixed air when forced from the mixing chamber into initial contact with said onions by varying the heating of said heated air which is mixed with said conditioned air in accordance with changes in the relative humidity of said mixed air subsequent to the impartation of heat thereto and prior to contact between said mixed air and said onions, and concurrently varying the volume of said conditioned air which is mixed with said heated air in accordance with changes in the capacity of said heated air to heat the conditioned air with which it is mixed to the degree fixed as the concurrently desired temperature of said mixed air when forced into initial contact with said onions.

6. The method of preserving and/or curing onions which includes confining fresh perishable onions for treatment with conditioned air within a substantially airtight insulated enclosure; heating and admitting air from said enclosure into a mixing chamber; admitting air into said mixing chamber which air prior to admission into said mixing chamber is conditioned to have and has a dew point and dry bulb temperature substantially lower than the concurrent dew point and dry bulb temperature of the air within said enclosure; mixing said conditioned air with said heated air; forcing the resultant mixed air from said mixing chamber into contact with and through said onions during the period that said onions are confined for treatment in said enclosure when the temperature of said onions is outside the degree of temperature fixed as the concurrently desired temperature of said onions and/or the relative humidity of the air within said enclosure is more than 70%, until the temperature of said onions is of said fixed degree and the relative humidity of said air is less than 70%; discharging superfluous air from said enclosure to the outside; and varying the volume of said conditioned air which is mixed with said heated air in accordance with changes in the capacity of said heated air to heat the conditioned air with which it is mixed to the degree fixed as the concurrently desired temperature of said mixed air when forced into contact with said onions to thereby regulate said desired temperature of said mixed air.

7. The method of preserving and/or curing onions which includes confining fresh perishable onions for treatment with conditioned air within a substantially airtight insulated enclosure; admitting air from said enclosure into a mixing chamber; admitting air into said mixing chamber which air prior to admission into said mixing chamber is conditioned to have and has a dew point and dry bulb temperature substantially lower than the concurrent dew point and dry bulb temperature of the air within said enclosure; mixing said conditioned air with the air admitted from said enclosure; imparting heat to the resultant mixed air, forcing the resultant heated mixed air from the mixing chamber into contact with and through said onions during the period that said onions are confined for treatment in said enclosure when the temperature of said onions is outside the degree of temperature fixed as the concurrently desired temperature of said onions and/or the relative humidity of the air within said enclosure is more than 70%, until the temperature of said onions is of said fixed degree and the relative humidity of said air is less than 70%; discharging superfluous air from said enclosure to the outside; and regulating the dew point and dry bulb temperature of said mixed air when forced into initial contact with said onions by varying the amount of heat imparted to said mixed air in accordance with changes in the relative humidity of said mixed air subsequent to said impartation of heat thereto and prior to contact between said mixed air and said onions, and concurrently varying the volume of conditioned air which is mixed with the air admitted from said enclosure in accordance with changes in the capacity of the heat imparted to said mixed air to heat the conditioned air contained in said mixed air to the degree of temperature fixed as the concurrently desired temperature of said mixed air when forced into initial contact with said onions.

8. The method of preserving and/or curing onions which includes confining fresh perishable onions for treatment with conditioned air within a substantially airtight insulated enclosure; admitting air from said enclosure into a mixing chamber; admitting air into said mixing chamber which air prior to admission into said mixing chamber is conditioned to have and has a dew point and dry bulb temperature substantially lower than the concurrent dew point and dry bulb temperature of the air within said enclosure; mixing said conditioned air with the air admitted from said enclosure; imparting heat to the resultant mixed air; forcing the resultant heated mixed air from said mixing chamber into contact with and through said onions during the period that said onions are confined for treatment in said enclosure when the temperature of said onions is outside the degree of temperature fixed as the concurrently desired temperature of said onions and/or the relative humidity of the air within said enclosure is more than 70%, until the temperature of said onions is of said fixed degree and the relative humidity of said air is less than 70%; discharging superfluous air from said enclosure to the outside; and varying the volume of conditioned air which is mixed with said air admitted from said enclosure in accordance with the capacity of the heat imparted to said mixed air to heat the fresh air contained in said mixed air to the degree of temperature fixed as the consurrently desired temperature of said mixed air when forced into initial contact with said onions and thereby regulating said temperature of said mixed air.

9. The method of preserving and/or curing onions which includes confining fresh perishable onions for treatment with conditioned air within a substantially airtight insulated enclosure; heating and admitting air from said enclosure into a mixing chamber; admitting from the outside into said mixing chamber fresh air having a dew point and dry bulb temperature substantially lower than the concurrent dew point and dry bulb temperature of the air within said enclosure; mixing said fresh air with said heated air; forcing the resultant mixed air from the mixing chamber into contact with and through said onions during the period that said onions are confined for treatment in said enclosure when the temperature of said onions is outside the degree of temperature fixed as the concurrently desired temperature of said onions and/or the relative humidity of the air within said enclosure is more than 70%, until the temperature of said onions is of said fixed degree and the relative humidity is less than 70%; discharging superfluous air from said enclosure to the outside; and regulating the dew point and dry bulb temperature of said mixed air when forced into initial contact with said onions by varying the heating of said heated air which is mixed with said fresh air in accordance with changes in the relative humidity of said mixed air under the control of the relative humidity of said mixed air prior to contact between said mixed air and said onions, and concurrently varying the volume of said fresh air which is mixed with said heated air admitted from said enclosure in accordance with changes in the capacity of said heated air to heat the fresh air contained in the resultant mixed air to the degree of temperature fixed as the concurrently desired temperature of said mixed air under the control of the dry bulb temperature of said mixed air subsequent to the formation thereof and prior to contact between said mixed air and said onions.

10. The method of preserving and/or curing onions which includes confining fresh perishable onions for treatment with conditioned air within a substantially airtight insulated enclosure; admitting air from said enclosure into a mixing chamber; admitting from the outside into said mixing chamber fresh air having a dew point and dry bulb temperature substantially lower than that of said air admitted from said enclosure; mixing said fresh air with said air admitted from said enclosure; imparting heat to the resultant mixed air; forcing the resultant mixed air from said mixing chamber into contact with and through said onions during the period that said onions are confined for treatment in said enclosure when the temperature of said onions is outside the degree of temperature fixed as the concurrently desired temperature of said onions and/or the relative humidity of the air within said enclosure is more than 70%, until the temperature of said onions is of said fixed degree and the relative humidity is less than 70%; discharging superfluous air from said enclosure to the outside; and regulating the dew point and dry bulb temperature of said mixed air when forced into initial contact with said onions by varying the amount of heat imparted to said mixed air in accordance with changes in the relative humidity of said mixed air subsequent to the impartation of heat thereto and prior to contact between said mixed air and said onions under the control of said relative humidity of said mixed air, and consurrently varying the volume of said fresh air which is mixed with said air admitted from said enclosure in accordance with changes in the capacity of the heat imparted to said mixed air to heat said fresh air contained in said mixed air to the degree of temperature fixed as the concurrently desired temperature of said mixed air under the control of the dry bulb temperature of said mixed air when forced into initial contact with said onions.

11. The method of preserving and/or curing onions which includes confining fresh perishable onions for treatment with conditioned air within a substantially airtight insulated enclosure; admitting air from said enclosure into a mixing chamber; admitting into said mixing chamber air having a dew point and dry bulb temperature substantially lower than the concurrent dew point and dry bulb temperature of the air within said enclosure; mixing said colder air with the warmer air admitted from said enclosure; heating at least one of the components of said mixed air; forcing the resultant mixed conditioned air from the mixing chamber into contact with and through said onions during the period that said onions are confined for treatment in said enclosure when the temperature of said onions is outside the degree of temperature fixed as the desired concurrent temperature of said onions and/or the relative humidity of the air within said enclosure is more than 70%, until the temperature of said onions is of said fixed degree and the relative humidity of said air within the enclosure is less than 70%; discharging superfluous air from said enclosure to the outside; and varying the volume of the colder air which is admitted into said mixing chamber and mixed therein with warmer air from said enclosure in accordance with changes in the capacity of the heat available to heat said colder air contained in said mixed air to the degree of temperature fixed as the concurrently desired temperature of said mixed air, and concurrently varying the impartation of heat to at least one component of said mixed air in a measure whereby the dew point of said mixed air is lower than the concurrent dew point of the air within said enclosure when said mixed air is forced into initial contact with said onions.

12. The method of curing onions which includes confining freshly harvested uncured onions for treatment with conditioned air within a substantially airtight enclosure; admitting air from said enclosure into a mixing chamber; admitting into said mixing chamber air having a dew point and dry bulb temperature substantially lower than the concurrent dew point and dry bulb temperature of the air within said enclosure; mixing said colder air admitted into said mixing chamber with the air from said enclosure; heating at least one of the components of said mixed air; forcing the resultant mixed conditioned air from the mixing chamber into contact with and through said onions during the period that said onions are confined for treatment in said enclosure when the temperature of said onions is substantially outside the range of 50° F.–60° F. and/or the relative humidity of air within said enclosure is more than 70%, until the temperature of said onions is substantially 50° F.–60° F. and the relative humidity of the air within said enclosure is less than 70%; discharging superfluous air from said enclosure to the outside; and varying the volume of the colder air which is admitted into said mixing chamber and mixed with the air admitted into said mixing chamber from said enclosure in accordance with changes in the capacity of the heat available to heat said colder air contained in said mixed air to the degree of temperature fixed as the desired temperature of said mixed air and concurrently varying the impartation of heat to at least one component of said mixed air in a measure whereby the dew point of said mixed air is lower than the concurrent dew point of the air within said enclosure when said mixed air is forced into initial contact with said onions.

13. The method of preserving cured onions which includes confining fresh perishable cured onions for treatment with conditioned air within a substantially airtight insulated enclosure; admitting air from said enclosure into a mixing chamber; admitting into said mixing chamber air having a dew point and dry bulb temperature substantially lower than the concurrent dew point and dry bulb temperature of the air within said enclosure; mixing said colder air admitted into said mixing chamber with the air admitted from said enclosure; heating at least one of the components of said mixed air; forcing the resultant mixed conditioned air from said mixing chamber into contact with and through said onions during the period that said onions are confined for treatment in said enclosure when the temperature of said onions is above freezing and at substantial variance from 32° F. and/or the relative humidity of the air within said enclosure is more than 70%, until the temperature of said onions is substantially 32° F. and the relative humidity of the air within said enclosure is less than 70%; discharging superfluous air from said enclosure to the outside; and varying the volume of the colder air which is admitted into said mixing chamber and mixed with the air admitted from said enclosure in accordance with changes in the capacity of the heat available to heat said colder air contained in said mixed air to the degree of temperature fixed as the concurrently desired temperature of said mixed air, and concurrently varying the impartation of heat to at least one component of said mixed air in a measure whereby the dew point of said mixed air is lower than the concurrent dew point of the air within said enclosure when said mixed air is forced into initial contact with said onions.

14. The method of preserving and/or curing onions which includes confining fresh perishable onions for treatment with conditioned air within a substantially airtight insulated enclosure; admitting air from said enclosure into a mixing chamber; admitting into said mixing chamber air having a dew point and dry bulb temperature substantially lower than the concurrent dew point and dry bulb temperature of the air within said enclosure; mixing said colder air with the warmer air admitted from said enclosure; heating at least one of the components of said mixed air; forcing the resultant mixed conditioned air from the mixing chamber into contact with and through said onions during the period that said onions are confined for treatment in said enclosure when the temperature of said onions is outside the degree of temperature fixed as the desired concurrent temperature of said onions and/or the relative humidity of the air within said enclosure is more than 70%, until the temperature of said onions is of said fixed degree and the relative humidity of said air within the enclosure is less than 70%; discharging superfluous air from said enclosure to the outside; and regulating the relative humidity and dry bulb temperature of said mixed air when forced into initial contact with said onions by varying the proportions of said colder and said warmer air in said mixed air and the heating of at least one of said air components in accordance with changes in the condition of said mixed air subsequent to the impartation of heat to at least one component thereof and prior to contact between said mixed air and said onions.

References Cited in the file of this patent

UNITED STATES PATENTS

| | | |
|---|---|---|
| 843,909 | Peters et al. | Feb. 12, 1907 |
| 1,431,146 | Bolling | Oct. 10, 1922 |
| 1,523,509 | Braemer | Jan. 20, 1925 |
| 1,693,856 | Moore | Dec. 4, 1928 |
| 2,251,617 | Pirnie | Aug. 5, 1941 |
| 2,365,890 | McBean | Dec. 26, 1944 |
| 2,370,422 | Reed | Feb. 27, 1945 |

FOREIGN PATENTS

| | | |
|---|---|---|
| 463,369 | Great Britain | Mar. 30, 1937 |